US007016042B2

(12) United States Patent
Edge et al.

(10) Patent No.: US 7,016,042 B2
(45) Date of Patent: Mar. 21, 2006

(54) COLOR PROFILING USING GRAY BACKING MATERIAL

(75) Inventors: Christopher J. Edge, St. Paul, MN (US); Jonathan A. Frost, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 287 days.

(21) Appl. No.: 10/647,791

(22) Filed: Aug. 25, 2003

(65) Prior Publication Data

US 2004/0119993 A1 Jun. 24, 2004

Related U.S. Application Data

(60) Provisional application No. 60/405,794, filed on Aug. 23, 2002.

(51) Int. Cl.
G01J 3/50 (2006.01)

(52) U.S. Cl. .................................... 356/402
(58) Field of Classification Search ................ 356/402, 356/405, 406, 407, 425
See application file for complete search history.

(56) References Cited

U.S. PATENT DOCUMENTS

| | | | |
|---|---|---|---|
| 4,623,938 A | 11/1986 | Asano et al. | |
| 4,970,584 A | 11/1990 | Sato et al. | |
| 5,724,259 A | 3/1998 | Seymour et al. | |
| 5,933,578 A | 8/1999 | Van de Capelle et al. | |
| 6,760,103 B1 * | 7/2004 | Shakespeare et al. | ....... 356/300 |

FOREIGN PATENT DOCUMENTS

| | | |
|---|---|---|
| DE | 198 48 085 A1 | 8/1999 |
| EP | 0 770 905 A2 | 5/1997 |
| EP | 0 977 420 A2 | 2/2000 |
| GB | 2 333 922 A | 8/1999 |

OTHER PUBLICATIONS

"Photography—Density Measurements—Part 4: Geometric conditions for reflection density," ISO 5-4, Second Edition, 1995, 13 pages.
"Viewing Conditions—Graphic Technology and Photography," ISO 3664, Second Edition, 2000, 31 pages.
"Graphic Technology—Exchange Format for Spectral Measurement, Colorimetric, and Densitometric Data in Electronic Form," Committee for Graphic Arts Standards (CGATS)/SC3 N 648, NPES, 2003, 23 pages.
"report on SC3 TF1 Experiment 2—Investigation of Visual and Objective Color Differences from Samples Made with a Range of ±3% Tone Value Increase ±0.05 Density," Committee for Graphics Arts Standards (CGATS)/SC3/Tf1 N 045, date unknown, 3 pages.
International Preliminary Examination Report for International Application No. PCT/US03/26631, filed Aug. 25, 2003, 9 pgs.

* cited by examiner

*Primary Examiner*—F. L. Evans

(57) ABSTRACT

Techniques for producing a color profile that characterize the color response of a color imaging device involve the use of a gray backing material. The gray backing material is placed behind a sheet of output media during measurement of color elements in a reference image formed on the output media. The gray backing material may be particularly useful for output media that is very thin or slightly transparent. In particular, unlike black or white backing materials, the gray backing material produces very little visual interference when the reference image is reproduced, providing a close visual match. Use of a gray backing material can support generation of more accurate color profiles.

39 Claims, 3 Drawing Sheets

COLOR PROFILING USING GRAY BACKING MATERIAL

This application claims priority from U.S. Provisional Application Ser. No. 60/405,794, filed Aug. 23, 2002, the entire content of which is incorporated herein by reference.

FIELD

The invention relates to color imaging and, more particularly, to techniques for profiling the output of color imaging systems.

BACKGROUND

Color profiling involves the generation of color profiles that characterize the output of color imaging devices using particular print media and colorants. Color profiles can be used to transform color image data for reproduction of color images using different types of color imaging devices.

Different types of imaging devices exhibit varied responses to input color image data. Indeed, color matching has become one of the most challenging problems in the field of color imaging. In response to a given set of input color image data, one type of imaging device may produce color output that is significantly different from the color output produced by another type of imaging device.

For example, the color output of a particular printer may be markedly different from the color output of a display device such as a cathode ray tube (CRT) monitor, even though the devices are presenting the same image. In addition, there may be significant variation among different imaging devices of the same type, such as different printers. Different output media, such as paper or film, and different colorants, such as inks and donor sheets, also contribute to variation.

To achieve more consistent color output among different devices, i.e., color matching, the input color image data can be transformed to compensate for color response differences among different devices. Transformation may involve numeric adjustment of individual color data values contained in the input color image data. The transformation process is sometimes referred to as correction or conversion. The transformation takes into account the individual color response characteristics of a particular imaging device.

Typically, the transformation relies on a source device profile and a destination device profile. A source profile characterizes the color response of a source device, whereas a destination profile characterizes the color response of the destination device. In the case of a printer, the profiles also may correspond to particular combinations of output media and ink. The source device may be an imaging device for which the input color image data was initially formulated. The destination device is the device selected by a user to reproduce the image.

To achieve similar output from the destination device, a color matching module uses the source and destination device profiles to determine the differences between the devices, and develops a mapping, or "link," that compensates for those differences. In particular, the mapping relates source device coordinates to destination device coordinates, and thereby facilitates transformation of the input color image data. For a display device, the device coordinates may be red, green, and blue (RGB). For a printer, the device coordinates may be cyan, magenta, yellow and black (CMYK).

Generation of color profiles typically involves driving a color imaging device to produce a range of color elements, or "patches," in response to a set of color image data. In the case of a printer, for example, a range of color patches is printed on a sheet of paper or film. The color profiling process further involves measuring the color elements to produce colorimetric values that characterize the response of the color imaging device to the color image data.

SUMMARY

The invention is directed to techniques for producing a color profile that characterize the color response of a color imaging device. The techniques involve the use of a gray backing material for a sheet of output media during measurement of color elements in a reference image formed on the output media to generate a color profile.

The gray backing material may be particularly useful for types of output media that are very thin or slightly transparent. In particular, unlike black or white backing materials, the gray backing material produces very little visual interference with the reference image.

When imagery is reproduced using the color profile, visual effects of the gray backing material are reduced, providing a close visual match between the original and reproduced imagery. In general, with a gray backing material, the invention can support generation of more accurate color profiles. The backing material may be "gray" in the sense that it has a color value corresponding to a percentage of a substantially neutral gray, e.g., in terms of spectral reflectance.

In one embodiment, the invention provides a method comprising placing a first side of an output medium on a gray backing material, and measuring color values for imagery formed on a second side of the output medium.

In another embodiment, the invention provides a system comprising an output medium, a gray backing material upon which is placed a first side of the output medium, and a measurement device oriented to measure color values for imagery formed on a second side of the output medium.

In an added embodiment, the invention provides a machine-readable medium comprising color profile data defining a color response for a color imaging device, wherein the color profile data identifies a gray backing material for an output medium associated with generation of the color profile.

In a further embodiment, the invention provides a method comprising printing a plurality of color elements on an output medium, placing a side of the output medium opposite the color elements on a gray backing material, measuring color values for the color elements formed on the output medium, and generating a color profile based on the measured color values. According to this embodiment, the gray backing material has a color value in a range of approximately thirty to seventy percent neutral gray.

In another embodiment, the invention provides a system comprising an output medium, a color printer to print a plurality of color elements on the output medium, a gray backing material upon which is placed a side of the output medium opposite the color elements, a measurement device to measure color values for the color elements formed on the output medium, and a processor to generate a color profile based on the measured color values. According to this embodiment, the gray backing material has a color value in a range of approximately thirty to seventy percent neutral gray.

The invention can provide one or more advantages. For example, unlike black or white backing materials, a gray backing material substantially reduces interference with color elements formed on the output medium for measurement and generation of a color profile. As a result, when the color profile is used to reproduce an image on different media, the visual effect of the gray backing material is less susceptible to detection by the human eye in an undesirable way. In this manner, the use of a gray backing material can promote reduced visual interference and a better match between an original image on original media and a reproduced image on different media, including subtractive output media such as paper or film, and emissive output media such as a CRT or LCD monitor.

Additional details of these and other embodiments are set forth in the accompanying drawings and the description below. Other features, objects and advantages will become apparent from the description and drawings, and from the claims.

DETAILED DESCRIPTION

Figure 1:
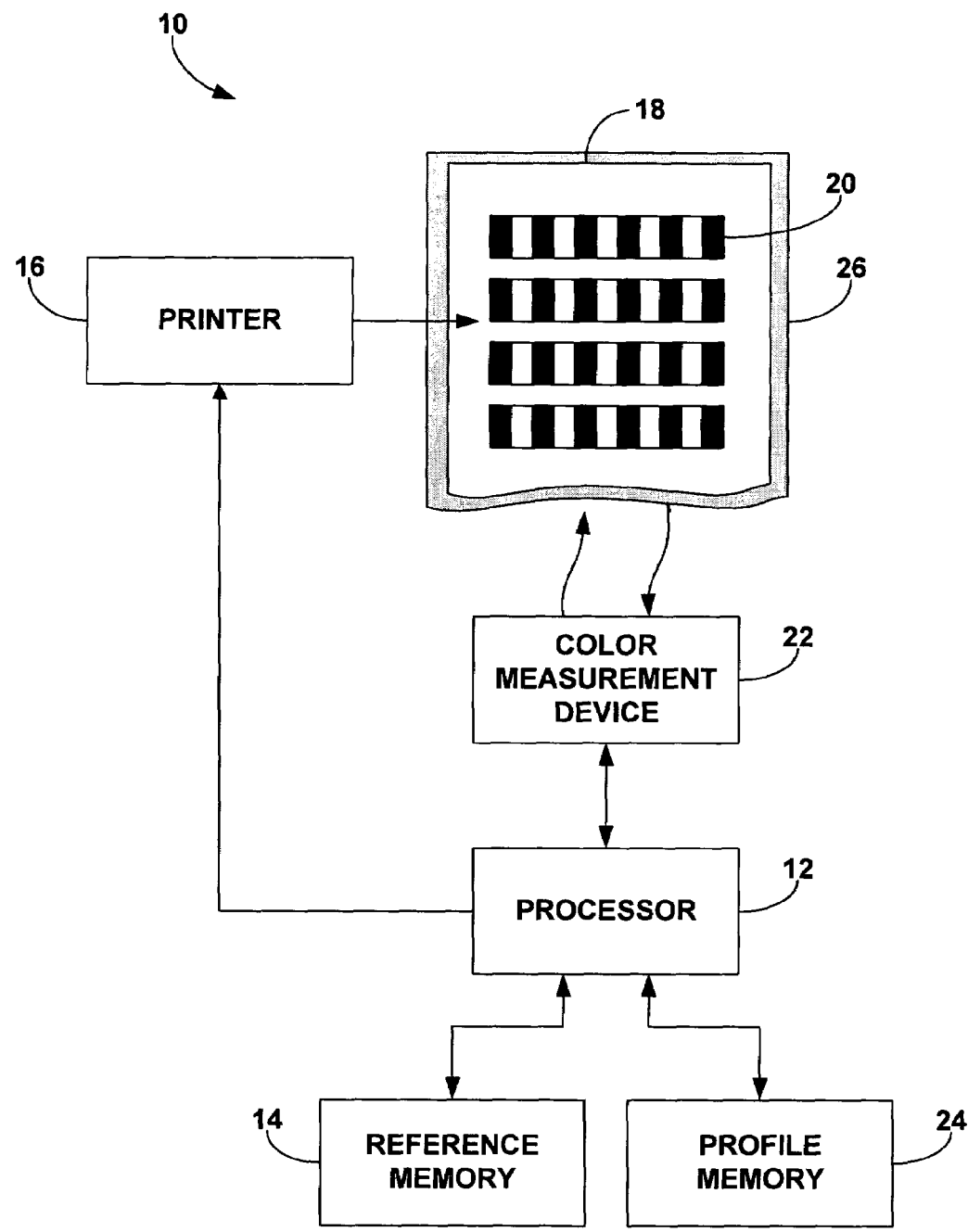
FIG. 1 is a block diagram of color profiling system.

FIG. 1 is a block diagram of color profiling system 10. In accordance with the invention, color profiling system 10 makes use of a gray backing material 26 during a color profiling process. In particular, the gray backing material 26 is placed behind a sheet of output media 18 during measurement of color elements in a reference image formed on the output media. The gray backing material 26 produces very little visual interference with the reference image, and promotes the generation of more accurate color profiles.

As shown in FIG. 1, color profiling system 10 may include a processor 12 that accesses color image data in a reference memory 14 to drive a printer 16. Processor 12, which may take the form of a microprocessor forming part of a personal computer or computer workstation, executes program code containing instructions that drive the color profiling process. In response to the color image data, printer 16 forms a reference image on a sheet of output media 18, such as paper or film. The reference image contains a plurality of color elements 20, such as an array of color patches having a range of color values that span a desired output range of printer 16.

A color measurement device 22 measures color values for color elements 20. For example, color measurement device 22 may measure reflectance color values and convert the color values to CIE XYZ tristimulus values. Color measurement device 22 may take the form of a colorimeter or spectrophotometer. Based on the color values measured by color measurement device 22, processor 12 generates a color profile representing the color response of printer 16 in combination with output medium 18. Processor 12 stores the color profile in a profile memory 24. The color profile may be similar in format to an International Color Consortium (ICC) color profile.

In accordance with the invention, system 10 provides a gray backing material 26 to promote increased color accuracy in the profile generated by processor 12. In particular, gray backing material 26 is placed on a side of output medium 18 opposite the side on which color elements 20 are formed. In other words, gray backing material 26 is placed behind or underneath output medium 18 during measurement of color values by color measurement device 22. Gray backing material 26 may be particularly useful for output media that is very thin or slightly transparent.

Unlike black or white backing materials, which are specified by the International Standards Organization (ISO) for color profiling, gray backing material 26 produces very little visual interference with the reference image. When imagery is reproduced using the color profile, visual effects of gray backing material 26 are reduced relative to black or white backing materials, providing a close visual match between the original and reproduced imagery. By measuring color values for color elements 20 formed on output media 18 using gray backing material 26, system 10 avoids color contamination from either white or black backing materials, and permits consistent appearance and measurement or color images.

When either black or white backing material is used for thin translucent paper during colorimetric measurement, the presence of the backing tends to "bleed through" the image formed on the paper. This effect can be visually observed when the image is later reproduced, e.g., on another sheet of output media or a CRT monitor. In the case of black backing material, the eyes see a darker, "dirtier" appearance that particularly impacts lighter shades of color. In the case of white backing material, saturated and dark regions of color appear washed out, less dense and less saturated.

Use of gray backing material 26 avoids the undesirable visual effects caused by white and black backing materials. In some embodiments, gray backing material 26 may have a color value in a range of approximately thirty to seventy percent neutral gray, and more preferably approximately fifty percent neutral gray. The color value may refer to a percentage of neural gray reflectance of gray backing material 26. As one example, the Munsell N8 gray color has a neutral spectral reflectance of approximately 50%. Other Munsell grays and Pantone grays have similar spectral reflectance characteristics. In general, such grays have a spectral reflectance that reflects substantially all colors in the visible spectrum with substantially equal amount, with the possible exception of some colors in the far blue or far red part of the spectrum. Accordingly, gray backing material 26 may have a color value, in terms of a spectral reflectance, of approximately thirty to seventy percent neutral gray, and more preferably approximately fifty percent neutral gray. Other color value representations are conceivable. For example, in terms of L*a*b*values, gray backing material 26 may have a color value of approximately 50 to 90 L*, and more preferably approximately 80 L*, along with color values of approximately 5 to 15 a*, and approximately 5 to 15 b*.

Figure 2:
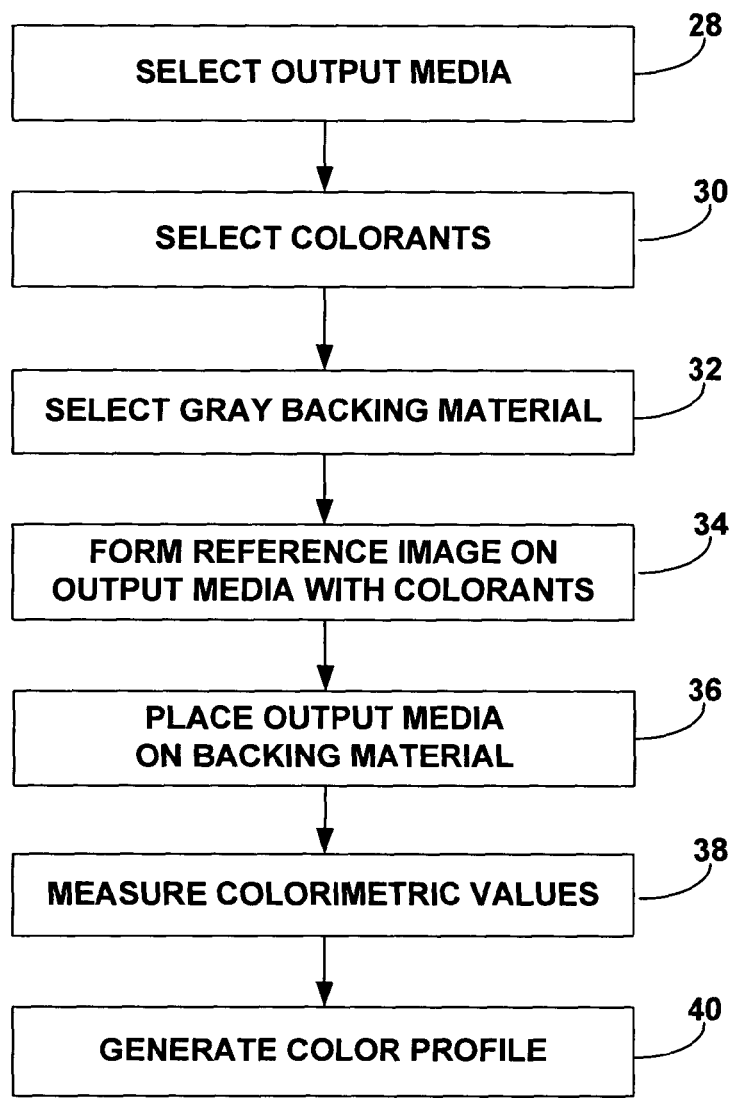
FIG. 2 is a flow diagram illustrating a color profiling process using a gray backing material.

FIG. 2 is a flow diagram illustrating color profiling process using a gray backing material. As shown in FIG. 2, the color profiling process may involve selection of particular output media (28), selection of particular colorants (30) to form imagery on the output media, and selection of a gray backing material (32) for the output media. Upon formation of a reference image on the output media using the selected colorants (34), the color profiling process involves placing the output media on the gray backing material (36).

As further shown in FIG. 2, the color profiling process involves measurement of colorimetric values for the color elements within the reference image (38), and generation of a color profile based on the measured colorimetric values (40). In general, it may be desirable to use the gray backing material in generation of color profiles for all combinations of output media, colorants, and printers, thereby alleviating the adverse visual effects caused by black, white or other non-gray backing materials.

Figure 3:
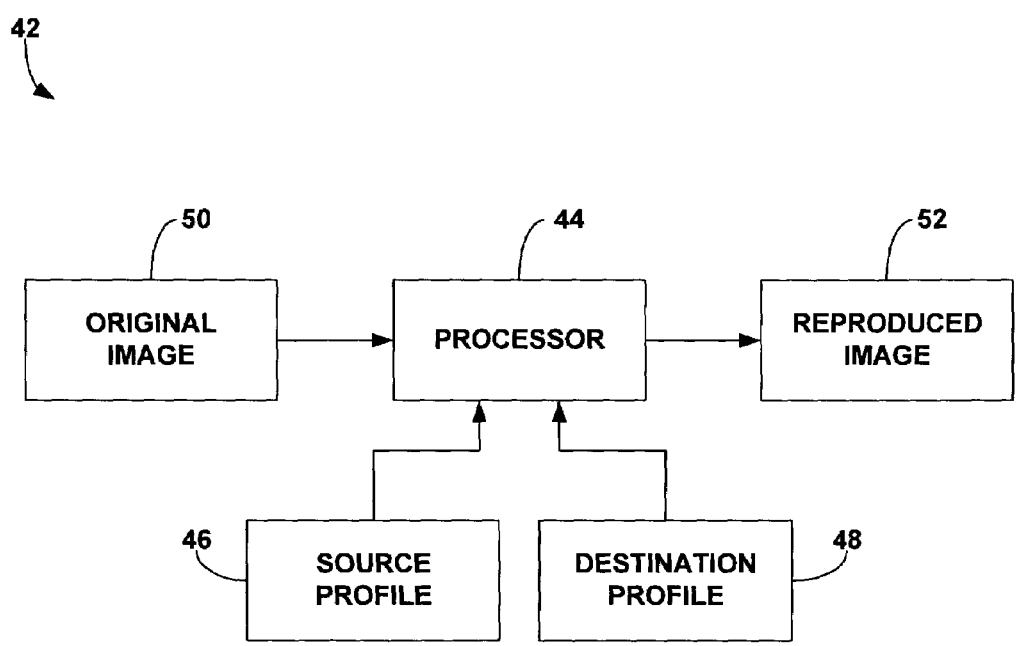
FIG. 3 is a block diagram illustrating a system for color transformation using a color profile.

FIG. 3 is a block diagram illustrating a system 42 for color transformation using a color profile. As shown in FIG. 3, system 42 includes a processor 44 that accesses a source profile 46 and a destination profile 48 from a machine-readable medium, e.g., a memory. Source profile 46 represents the color response of a first imaging device in combination with particular output media and colorants. Similarly, destination profile 48 represents the color responses of a second imaging device in combination with particular output media and colorants.

Source and destination profiles 46, 48 may be prepared by taking color measurements using gray backing material as described above with reference to FIGS. 1 and 2. In the example of FIG. 3, processor 44 uses source profile 46 to define the color response of a first ("source") imaging device to be emulated, and destination profile 48 to define the color response of a second ("destination") imaging device that emulates the first imaging device. In particular, processor 44 generates a device link that maps color values of an original image on the source imaging device to color values of a reproduced image on the destination device, providing color match accuracy between the original and reproduced images. Again, the use of a gray backing material to form the source and destination profiles can improve the color match accuracy be reducing adverse visual effects associated with white or black backing materials.

In accordance with the invention, a machine-readable medium storing a color profile is also contemplated. For example, a machine-readable medium may contain color profile data that defines the color response of an imaging device in combination with an output medium and particular colorants. The color profile data may generally conform to ICC profile specifications, but further identify a gray backing material for the output medium associated with generation of the color profile. Thus, in addition to data defining color response, the color profile data indicates the type of backing material used to generate the color profile. The data may, for example, identify a gray backing material having a color value, such as a spectral reflectance, in a range of approximately thirty to seventy percent neutral gray.

The machine-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. In addition, the machine-readable medium may comprise communication media such as a carrier wave or other transport medium modulated to encode the color profile data. By way of example, and not limitation, communication media includes wired media, such as a wired network or direct-wired connection, and wireless media, such as acoustic, RF, infrared, and other wireless media. Computer readable media may also include combinations of any of the media described above.

Various embodiments of the invention have been described. These and other embodiments are within the scope of the following claims.

What is claimed is:

1. A method comprising:
   placing a first side of an output medium on a gray backing material; and
   measuring color values for imagery formed on a second side of the output medium, wherein the gray backing material has a color value in a range of approximately thirty to seventy percent neutral gray.

2. The method of claim 1, wherein the gray backing material has a color value of approximately fifty percent neutral gray.

3. The method of claim 1, wherein the output medium comprises paper.

4. The method of claim 1, wherein the output medium comprises film.

5. The method of claim 1, wherein the imagery comprises a plurality of color elements representing a range of colors.

6. The method of claim 1, further comprising measuring the color values using one of a colorimeter and a spectrophotometer.

7. A method comprising:
   placing a first side of an output medium on a gray backing material; and
   measuring color values for imagery formed on a second side of the output medium, wherein the gray backing material has a color value of approximately 50 to 90 L*, approximately 5 to 15 a*, and approximately 5 to 15 b*.

8. A method comprising:
   placing a first side of an output medium on a gray backing material; and
   measuring color values for imagery formed on a second side of the output medium, wherein the gray backing material has a color value of approximately 80 L*.

9. A method comprising:
   placing a first side of an output medium on a gray backing material;
   measuring color values for imagery formed on a second side of the output medium; and
   generating a color profile based on the measured color values.

10. A method comprising:
    placing a first side of an output medium on a gray backing material;
    measuring color values for imagery formed on a second side of the output medium; and
    forming the imagery on the second side of the output medium using a color printer.

11. The method of claim 10, wherein the color printer is one of an inkjet, laser, or dye transfer printer.

12. A method comprising:
    placing a first side of an output medium on a gray backing material;
    measuring color values for imagery formed on a second side of the output medium;
    generating a color profile based on the measured color values; and
    transforming a color image based on the color profile.

13. A system comprising:
    an output medium;
    a gray backing material upon which is placed a first side of the output medium; and
    a measurement device oriented to measure color values for imagery formed on a second side of the output medium, wherein the gray backing material has a color value in a range of approximately thirty to seventy percent neutral gray.

14. The system of claim 13, wherein the gray backing material has a color value of approximately fifty percent neutral gray.

15. The system of claim 13, wherein the output medium comprises paper.

16. The system of claim 13, wherein the output medium comprises film.

17. The system of claim 13, further comprising a color printer that forms the imagery on the second side of the output medium.

18. The system of claim 17, wherein the color printer is one of an inkjet, laser, or dye transfer printer.

19. The system of claim 13, wherein the imagery comprises a plurality of color elements representing a range of colors.

20. The system of claim 13, wherein the measurement device includes one of a colorimeter and a spectrophotometer.

21. The system of claim 13, further comprising a processor that generates a color profile based on the measured color values, and transforms a color image based on the color profile.

22. A system comprising:
an output medium;
a gray backing material upon which is placed a first side of the output medium; and
a measurement device oriented to measure color values for imagery formed on a second side of the output medium, wherein the gray backing material has a color value of approximately 50 to 90 L*, approximately 5 to 15 a*, and approximately 5 to 15 b*.

23. A system comprising:
an output medium;
a gray backing material upon which is placed a first side of the output medium; and
a measurement device oriented to measure color values for imagery formed on a second side of the output medium, wherein the gray backing material has a color value of approximately 80 L*.

24. A system comprising:
an output medium;
a gray backing material upon which is placed a first side of the output medium; and
a measurement device oriented to measure color values for imagery formed on a second side of the output medium; and
a processor that generates a color profile based on the measured color values.

25. A machine-readable medium comprising color profile data defining a color response for a color imaging device, wherein the color profile data identifies a gray backing material for an output medium associated with generation of the color profile.

26. The machine-readable medium of claim 25, wherein the gray backing material has a color value in a range of approximately thirty to seventy percent neutral gray.

27. The machine-readable medium of claim 25, wherein the gray backing material has a color value of approximately fifty percent neutral gray.

28. The machine-readable medium of claim 25, wherein the gray backing material has a color value of approximately 50 to 90 L*, approximately 5 to 15 a*, and approximately 5 to 15 b*.

29. The machine-readable medium of claim 25, wherein the gray backing material has a color value of approximately 80 L*.

30. A method comprising:
printing a plurality of color elements on an output medium;
placing a side of the output medium opposite the color elements on a gray backing material, wherein the gray backing material has a color value in a range of approximately thirty to seventy percent neutral gray;
measuring color values for the color elements formed on the output medium; and
generating a color profile based on the measured color values.

31. The method of claim 30, wherein the gray backing material has a color value of approximately fifty percent neutral gray.

32. The method of claim 30, wherein the gray backing material has a color value of approximately 50 to 90 L*, approximately 5 to 15 a*, and approximately 5 to 15 b*.

33. The method of claim 30, wherein the gray backing material has a color value of approximately 80 L*.

34. The method of claim 30, wherein the output medium comprises one of paper and film.

35. A system comprising:
an output medium;
a color printer to print a plurality of color elements on the output medium;
a gray backing material upon which is placed a side of the output medium opposite the color elements, wherein the gray backing material has a color value in a range of approximately thirty to seventy percent neutral gray;
a measurement device to measure color values for the color elements formed on the output medium; and
a processor to generate a color profile based on the measured color values.

36. The system of claim 35, wherein the gray backing material has a color value of approximately fifty percent neutral gray.

37. The system of claim 35, wherein the gray backing material has a color value of approximately 50 to 90 L*, approximately 5 to 15 a*, and approximately 5 to 15 b*.

38. The system of claim 35, wherein the gray backing material has a color value of approximately 80 L*.

39. The system of claim 35, wherein the output medium comprises one of paper and film.

* * * * *